March 8, 1932.  J. S. REID  1,848,198
PIPE COUPLING
Filed Dec. 19, 1928
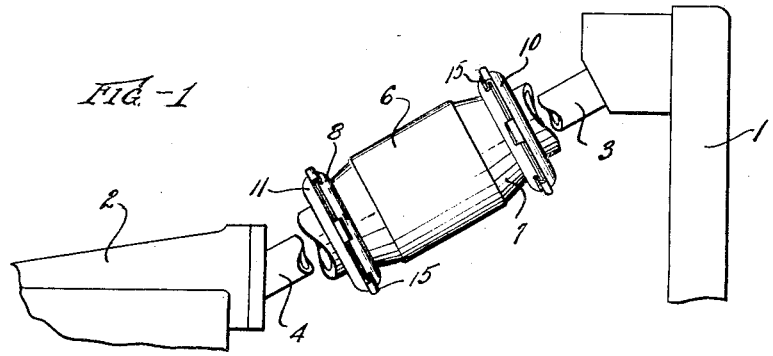
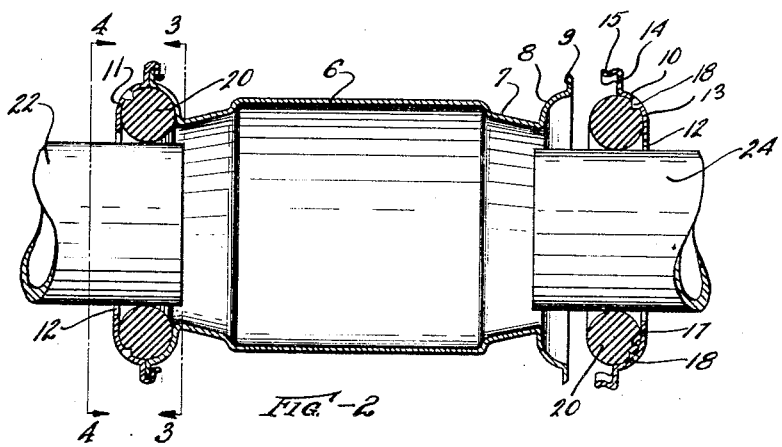
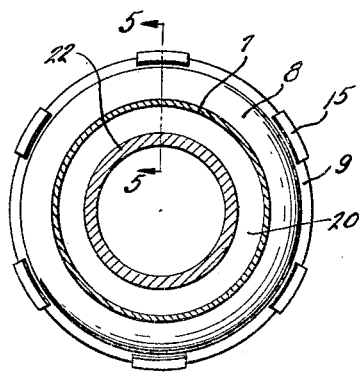 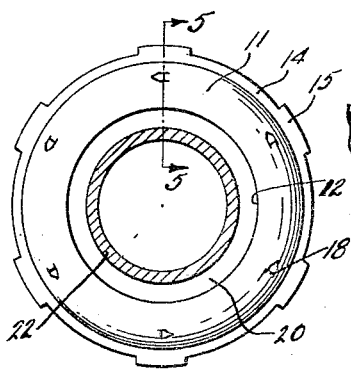
INVENTOR
JAMES S. REID
BY
Brockett, Hyde, Higley & Meyer
ATTORNEYS Patented Mar. 8, 1932

1,848,198

UNITED STATES PATENT OFFICE

JAMES S. REID, OF CLEVELAND, OHIO

PIPE COUPLING

Application filed December 19, 1928. Serial No. 327,050.

This invention relates to improvements in pipe couplings and more particularly, to a coupling especially adapted for connecting the adjacent ends of the two metal pipes associated with or connected to the motor water jacket and the radiator of a motor vehicle, although capable of general use.

The general object of the present invention is the provision of an improved pipe coupling capable of being easily and quickly connected to and disconnected from the adjacent ends of two pipes, such as the pipes above mentioned, and without the necessity of rotating the main body portion of the coupling to effect such connection or disconnection; which coupling includes three metal coupling parts, an intermediate body member and two separate end members adapted to be connected thereto, each of said end members having a sealing gasket secured or anchored thereto so that the connection of the end members to the intermediate body member properly positions the two sealing gaskets within the coupling; and which coupling is of extremely simple and inexpensive construction so that it can be made and sold at low cost.

Further objects of the invention are in part obvious and in part will appear more in detail hereinafter.

In the drawings, Fig. 1 is a side elevation of portions of the motor water jacket and the radiator of a motor vehicle with the adjacent ends of the two pipes associated with said parts connected by my improved coupling, the coupling and portions of said pipes being enlarged for clearness of illustration; Fig. 2 is a still further enlarged longitudinal sectional view of said coupling with one of its ends connected to one pipe and another pipe in position to have the other end of the coupling connected thereto; Figs. 3 and 4 are cross sectional views on respectively the lines 3—3 and 4—4, Fig. 2; and Fig. 5 is a detailed sectional view on the lines 5—5, Figs. 3 and 4.

Referring to the drawings, 1 represents a portion of the radiator and 2 a portion of the motor water jacket of a motor vehicle, and the present coupling was especially designed for connecting the adjacent ends of the pipes 3 and 4 respectively associated therewith or connected thereto.

Said coupling includes three coupling parts a body or intermediate member, which is the main part of the coupling, and two separate end members adapted to be connected to and disconnected from said body member. Said body member is of sheet metal having a cylindrical middle portion 6, two inwardly tapered intermediate portions 7 and two annular, outwardly and forwardly curved gasket-engaging end portions 8 which terminate in short outwardly extending annular flanges 9.

The two end members 10 and 11, which are identical throughout and therefore interchangeable, are also formed of sheet metal and each has a central pipe receiving opening 12, a curved gasket engaging and carrying portion 13 of annular form, a short annular flange 14 extending outwardly from the outer end of said curved portion, and a plurality of locking tongues 15 circumferentially spaced about the outer edge of said flange 14, said tongues being initially generally perpendicular to said flange and extending therefrom in the direction in which the gasket carrying portion 13 is curved, as clearly indicated at the right hand end of Fig. 2. The tongues 15 of the two end members 10 and 11 are adapted for locking engagement with the annular flanges 9 of the coupling body member, as will more fully appear.

The inner surfaces 17 of the gasket carrying portions 13 of the two end members are each provided with a circumferentially spaced series of projections or prongs 18, six in the present case. These projections or prongs are adapted to be pushed into and thereby anchor or secure to the inner surface of each end portion 13 a sealing gasket 20, which is of annular form, circular in cross-section and of rubber or other yielding material. One simple way of forming these projections or prongs is to shear or punch them from the end portions 13 and this is the way illustrated in the drawings.

The adjacent ends of two pipes, such as the pipes 22, 24 in Fig. 2, are connected by my improved coupling by pushing the two end members 10 and 11, with their gaskets secured thereto, over the ends of said pipes, as indicated with the right hand end member 10 in Fig. 2. The coupling body member is then brought to the position indicated in Fig. 2 with its end portions 8 telescoping the ends of the pipes. The end members, in turn, are then moved against the ends of the coupling body member, until the outwardly extending flanges 14 of said end members engage or abut the outwardly extending end flanges 9 of said body member. The locking tongues 15 of the end member flanges 14 are then bent inwardly back of the body member flanges 9, as clearly indicated in Fig. 5, which securely locks the coupling end members to the coupling body member. To remove the coupling from the pipes, it is only necessary to disconnect the coupling end members from the coupling body member, which can be easily and quickly done by inserting a screw driver or the like beneath the locking tongues 15 of the end members and prying said tongues outwardly to free them from locking engagement with the flanges 9 of the coupling body member, all as will be readily understood.

The curved end portions 8 of the coupling body member cooperate with the curved portions 13 of the coupling end members to provide annular grooves for the sealing gaskets 20, and these grooves may be made of considerable depth in the present improved construction.

Since it is not necessary to rotate the coupling body member in connecting or disconnecting two pipes, the ends of said pipes may be out of alignment and the coupling body member of angular shape. Sometimes, angular coupling body members might be desired in places where there is insufficient space to rotate them, and in such places, the present coupling would be especially useful.

What I claim is:

A coupling for a pair of adjacent, substantially aligned pipe ends, comprising a tubular sheet metal body member adapted to substantially span the space between said pipe ends and provided at each of its two ends with an outwardly curved, annular, gasket-engaging portion terminating in an outwardly extending, annular flange, two sheet metal end members each having a central pipe-receiving opening and an outwardly curved, annular, gasket-engaging portion terminating in an outwardly extending, annular flange, the gasket-engaging portions of said body member and of said end members together forming at each end of said body member, when the flanges of said end members are in abutting relation with the flanges of said body member, an annular, gasket-receiving groove of generally semi-circular shape in cross section, an annular sealing gasket of generally circular shape in cross section arranged in each of the two gasket-receiving grooves thus formed, and locking tongues adapted, when the flanges of said end members are in abutting relation with the flanges of said body member, to be bent over and back of one of the flanges of each abutting pair of flanges, said tongues being carried by the other flange of each abutting pair of flanges, whereby said end members are locked to said body member with the flanges of said body and end members in abutting relation.

In testimony whereof I hereby affix my signature.

JAMES S. REID.